Figure 1:
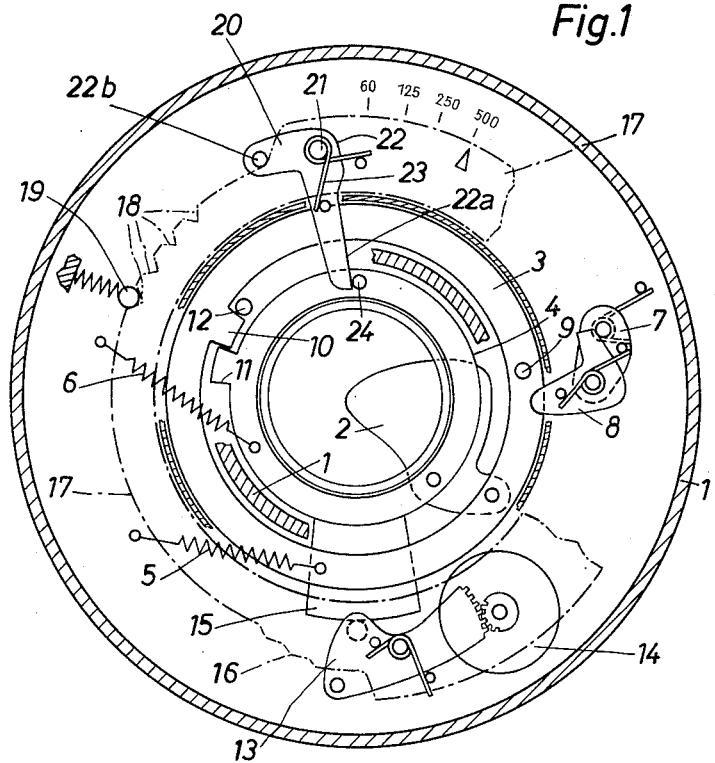

Jan. 25, 1966  G. KIPER  3,230,854

SHUTTER OPERATING STRUCTURE FOR CAMERAS

Filed April 23, 1963

INVENTOR.

GERD KIPER

BY MICHAEL S. STRIKER his ATTORNEY 3,230,854
SHUTTER OPERATING STRUCTURE
FOR CAMERAS
Gerd Kiper, Unterhaching, near Munich, Germany, assignor to Agfa Aktiengesellschaft, Leverkusen, Germany
Filed Apr. 23, 1963, Ser. No. 275,046
Claims priority, application Germany, May 3, 1962,
A 40,122
8 Claims. (Cl. 95—63)

The present invention relates to cameras. More particularly, the present invention relates to shutter assemblies for cameras.

Shutter assemblies are known wherein the blades of the shutter are actuated by a pair of shutter rings one of which is a shutter-opening ring and the other is a shutter-closing ring. These rings of a shutter of the above type are turned together from a rest position to a cocked position so that the shutter remains closed during each turning of the rings, whereupon the shutter-opening ring is released for return to its rest position in advance of the shutter-closing ring so that the shutter blades are turned in order to open the shutter, and after a predetermined exposure time the shutter-closing ring returns from its cocked to its rest position in order to close the shutter.

Shutters of this construction have certain advantages because of their simplicity and relatively small mass so that they are particularly suited for cameras which are operated automatically at least in part, and in addition it is possible to provide without too much structure and without using springs that are undersirably strong relatively short exposure times.

Also, shutters of this construction are particularly suited for relatively simple cameras where instead of retaining the shutter in its cocked position a single structure is manipulated to turn the rings together from their rest to their cocked positions with the shutter rings automatically returning to their rest positions to provide the exposure after the structure which cocks the shutter has been moved through a certain increment.

While shutters of this type are of advantage for the reasons pointed out above, they have the drawback of making it difficult to provide relatively short exposure times with relatively large apertures. Thus, as long as the aperture is relatively small the shutter blades are capable of being actuated by the shutter opening and shutter closing rings so as to move past a relatively small diaphragm opening to provide accurate exposure times. However, when the diaphragm is set to provide a relatively large exposure aperture, the blades of a shutter of the above type do not ordinarily move past a relatively large aperture with a speed which is great enough to provide with the desired accuracy relatively short exposure times. In other words relatively large apertures will have an undesirable influence on relatively short exposure times provided with shutters of the above type so that it is not possible to provide acurate relatively short exposure times without taking special measures for this purpose.

In order to avoid this latter drawback it has already been proposed to act on shutter rings of a shutter assembly of the above type with springs which are far stronger than conventional springs used with such assemblies so that in this way the rings will move even during relatively short exposure times with a rapidity which will provide accurate relatively short exposure times even with large apertures, but the disadvantage of this construction is that the relatively strong springs make the assembly all the more difficult to operate and undersirably increase the friction between the parts and the force with which the retarding mechanism must act on the shutter-closing ring to retard the latter in order to provide a selected exposure time. Also, there are known relatively complex and expensive structures which will bring into play increased forces acting to return the shutter rings to their rest positions when the camera is set to provide the shortest exposure times in combination with relatively large apertures.

A primary object of the present invention is to provide a structure which enables shutters of the above type to provide very acurate short exposure times even with large apertures while using only a very simple structure for this purpose.

An additional object of the present invention is to provide a structure which will increase the spring force by only an extremely small amount in order to provide accurate relatively short exposure times with shutter assemblies of the above type, even when the camera is set at a relatively large exposure aperture.

An additional object of the present invention is to provide a shutter of the above type which retains all of the advantages of such a shutter, such as its simplicity of construction and a small mass of its parts, so that the shutter can, for example, be operated automatically without difficulty, while at the same time guaranteeing accurate short exposure times even with large apertures.

An additional object of the present invention is to provide a structure of the above type which operates in a fully automatic manner without requiring any special manipulation on the part of the operator in order to provide an accurate short exposure time even when the camera is set at a relatively large exposure aperture.

With these objects in view, the invention includes in a camera, a shutter assembly which has, among its components, a shutter-opening ring and a shutter-closing ring. A means is provided to coact with these rings for respectively turning them together from rest positions thereof where the shutter is closed to cocked positions while the shutter remains closed and for releasing first the shutter-opening ring for return from its cocked to its rest position for opening the shutter and then the shutter-closing ring for return from its cocked to its rest position for closing the shutter. A spring means constructed in accordance with the present invention is operatively connected to these rings for urging them to their rest positions, respectively, and the assembly includes an exposure-time setting means which is operatively connected to the assembly for setting it to provide exposure times ranging from relatively long to relatively short exposure times. The structure of the invention also includes a force-increasing means which is actuated by the exposure-time setting means and which coacts with the spring means for increasing only the force with which the spring means urges the shutter-closing ring to its rest position when the exposure-time setting means sets the shutter assembly to provide relatively short exposure times.

Figure 2:
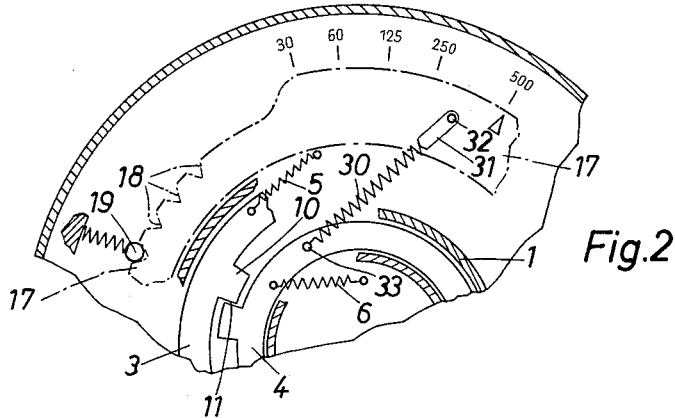

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a partly sectional and partly diagrammatic illustration of one possible embodiment of a structure according to the present invention, the section of FIG. 1 being taken in a plane which is normal to the optical axis; and FIG. 2 is a fragmentary illustration of another embodiment of a structure according to the present invention, the plane of FIG. 2 also being taken normal to the optical axis.

Referring to FIG. 1, it will be seen that there is illustrated therein a between-the-lens shutter assembly which includes the shutter housing 1 and the shutter blades 2. Only one shutter blade 2 is illustrated for the sake of clarity. This shutter blade 2 is pivotally connected on the one hand to a shutter-opening ring 3 which is supported for rotation about the optical axis and on the other hand to a shutter-closing ring 4 which is coaxial with the ring 3 and which is also supported for rotation about the optical axis. A spring means urges the rings 3 and 4 to the rest positions thereof, respectively, which are illustrated in FIG. 1, and this spring means includes three springs, two of which are formed by the springs 5 and 6. The spring 5 is permanently connected with the ring 3 for permanently urging the latter in a clockwise direction, as viewed in FIG. 1, to the illustrated rest position thereof where a lug 10 of the ring 3 engages a stationary pin 12. The spring 6 is permanently connected with the shutter-closing ring 4 for permanently urging the latter in a clockwise direction, as viewed in FIG. 1, to the illustrated rest position thereof where a lug 11 of the ring 4 engages the lug 10 of the ring 3. The third spring of the spring means is formed in the embodiment of FIG. 1 by the spring 23 and in the embodiment of FIG. 2 by the spring 30, and these third springs are described in greater detail below. A means is provided for turning the rings 3 and 4 from the illustrated rest position thereof together to cocked positions, respectively, so that since there is no relative turning between the rings at this time the shutter blades 2 do not turn relative to each other and the shutter remains closed. The means which acts on the rings to simultaneously turn them together to their cocked positions will first release the shutter-opening ring 3 so that the spring 5 returns the latter to the rest position illustrated in FIG. 1, and since the ring 3 at this time turns relative to the ring 4, the blades 2 turn relative to each other and outwardly away from the optical axis thus opening the shutter in order to expose the film. After a preselected exposure time has expired the ring 4 will be released to the spring 6 which returns the ring 4 to the rest position thereof illustrated in FIG. 1, and in this way the blades 2 are returned to the position illustrated in FIG. 1 where the shutters again close so that the exposure is completed.

This means for turning the rings 3 and 4 and releasing them one after the other in the above-described manner includes the rotary lever 7 which is manually turned in a clockwise direction, as viewed in FIG. 1, through any suitable unillustrated structure which is accessible to the operator. A spring urges the lever 7 to return to the illustrated rest position thereof. The lever 7 pivotally carries a swing member 8 which is urged by a spring acting on the lever 7 and the member 8 to turn to the position illustrated in FIG. 1 where an extension of the swing member 8 engages the pivot pin which supports the lever 7 for turning movement. The shutter-opening ring 3 carries a pin 9 which is located in the path of turning of the outer tip of the swing member 8. Thus, as the operator turns the lever 7 in a clockwise direction, as viewed in FIG. 1, the swing member 8 will turn with the lever 7 and the tip of the member 8 will engage the pin 9 so as to displace the ring 3 in opposition to the spring 5 in a counterclockwise direction with the result that the lug 10 moves away from the pin 12. The lug 10 transmits its movement to the lug 11 and thus the ring 4 also moves at this time in opposition to the spring 6 together with the ring 3 and thus the shutter blades do not turn relative to each other and the shutter remains closed. The operator will turn the lever 7 in this manner until the outer tip of the swing member 8 rides off the pin 9. Before the tip of the swing member 8 rides off the pin 9, however, the extension 15 of the shutter-closing ring 4 is engaged by the retarding mechanism 13, 14. Thus, it will be seen that this mechanism includes the lever 13 which is urged by the spring shown in FIG. 1 to turn in a clockwise direction, and before the tip of the swing member 8 rides off the pin 9 the extension 15 of the ring 4 will have been turned in a counterclockwise direction, and as viewed in FIG. 1, through a distance sufficient to enable a pin of the lever 13 which presses against the outer circular periphery of the extension 15 to ride beyond the left corner of the outer periphery of the extension 15 inwardly along the left side of the extension 15, as viewed in FIG. 1, and thus in order for the spring 6 to return the ring 4 back to its rest position it is necessary for the extension 15 to displace the lever 13 back to the position thereof shown in FIG. 1. This lever 13 has a gear sector portion meshing with a pinion which is coaxially fixed to a rotary, retarding mass 14 so that the return of the shutter-closing ring 4 to its rest position is delayed in a well-known manner by this retarding mechanism 13, 14 so as to provide the desired exposure time. As soon as the lever 13 releases the extension 15 the spring 6 returns the ring 4 to its rest position, thus closing the shutter. Therefore, it will be seen that the manually operated structure 7, 8 together with the retarding mechanism 13, 14 form the above-referred to means which coacts with the rings 3 and 4 for turning them together from the illustrated rest position in opposition to the springs 5 and 6 to their cocked positions and for releasing first the shutter-opening ring 3 and subsequently the shutter-closing ring 4.

An exposure-time setting means is provided to set the camera to provide a preselected exposure time, and this exposure-time setting means includes the rotary ring 17 which is shown in dot-dash lines and which is capable of being manually turned to a selected angular position in a manner well known in the art. The ring 17 is provided with the V-notches 18 which cooperate with a spring-pressed ball 19 so that in this way the exposure-time setting ring 17 will be releasably retained in a selected angular position. The ring 17 has a stepped peripheral portion 16 located in the path of movement of the pin carried by the lever 13 so that the extent to which the latter turns with respect to the extension 15 is determined by the step 16 which engages the pin of the lever 13, and in this way the extension 15 will be compelled by the spring 6 to turn the lever 13 through a smaller or larger angle thus enabling the retarding mechanism 13, 14 to control the exposure time. As is diagrammatically shown in FIG. 1 the exposure-time setting means includes an index cooperating with a scale of exposure times, and FIG. 1 shows that the exposure times in the illustrated example range from relatively long exposure times on the order of 1/60 sec. to relatively short exposure times on the order of 1/500 sec.

The rotary exposure-time setting ring 17 includes a camming portion 20 which is connected to the ring 17 for rotary movement therewith and which in the illustrated example is integral with the ring 17 and forms a curved portion of the outer periphery of the ring 17, this camming means 20 forming part of a force-increasing structure in the embodiment of FIG. 1, as described below.

As was indicated above, the spring means includes in addition to the springs 5 and 6 the spring 23 in the embodiment of FIG. 1, and a force-increasing means is provided for increasing the force with which the spring means urges the shutter-closing ring 4 back towards its rest position shown in FIG. 1 only when the exposure time setting means 17 sets the shutter assembly to provide relatively short exposure times, and it will be noted that the exposure-time setting means 17 is set in such a position in FIG. 1. This force-increasing means includes in addition to the camming structure 20, referred to above a lever 22 which forms a lever means for transmitting the force of the spring 23 to the ring 4 through a pin 24 which is fixed to the ring 4 and which is engaged by the lever 22 when the parts have the position shown in FIG. 1. The lever means 22 for transmitting the force of the spring 23 to the ring 4 is supported for rotation by a stationary pivot pin 21, and it will be noted that the spring 23 is coiled about the pin 21, has one free end engaging a pin fixedly carried by the lever 22 and has another free end engaging a stationary pin, so that the spring 23 urges the lever 22 to turn in a counterclockwise direction, as viewed in FIG. 1. Thus, the lever 22, which is in the form of a bell crank, will have its arm 22b urged toward the peripheral portion of the ring 17 which forms the camming structure 20 while the arm 22a will be urged toward the pin 24 which is fixed to the ring 4. Actually the arm 22b carries a pin which overlies the outer peripheral edge of the pin 17, while the pin 24 extends through the plane in which the lever 20 turns so that the pin 24 is located in the path of turning movement of the arm 22a, as indicated in FIG. 1. When the ring 17 is set to provide a relatively short exposure time such as $\frac{1}{500}$ sec. as indicated in FIG. 1, the camming means 20 will position the lever means 22, which is acted upon by the spring 23, in such a position that the outer free end of the arm 22a extends across the circle along which the pin 24 turns during rotary movement of the shutter-closing ring 4. As a result, when the assembly 7, 8 is turned in the manner described above to cock the rings 3 and 4, the pin 24 will turn the lever 22 in opposition to the spring 23, so that the force-increasing means formed by the cam 20 and the lever 22 will render the spring 23 operative to increase the force with which the ring 4 is urged back toward its rest position when the exposure-time setting means sets the assembly to provide a relatively short exposure time. Thus, when the exposure-time setting means has been set as illustrated in FIG. 1, at the instant when the tip of the swing-member 8 rides off the pin 9 the shutter-closing ring 4 will be urged back toward its rest position not only with the force of the spring 6 but also with the force of the spring 23 which acts through the lever 22 and the pin 24 on the ring 4, so that the speed of movement of the ring 4 will be accelerated beyond the speed with which it would turn as a result of a force exerted only by the spring 6, and thus when the camera is set to provide a relatively short exposure time the additional force of the spring 23 is automatically called into play to provide the selected relatively short exposure time with the required accuracy even if the aperture of the camera is set to provide a relatively large opening.

On the other hand, if the exposure-time setting means 17 sets the assembly to provide relatively long exposure times, then the pin of the arm 22b of the lever 22 is engaged by a portion of the outer periphery of the ring 17 which is located at a distance from the optical axis which is greater than the distance of the peripheral portion of the ring 17 which engages the pin of the arm 22b when the ring 17 is set to provide a relatively short exposure time, and the result is that the camming means 20 acts on the lever means 22 for turning the latter again in opposition to the spring 23 in a clockwise direction, as viewed in FIG. 1, but at this time the outermost peripheral portion of the ring 17 will act on the lever 22 to maintain the latter at an angular position where the outer free end of the lever arm 22a is located outwardly beyond the circle along which the pin 24 turns so that at relatively long exposure-times the lever 22 and thus the spring 23 will have absolutely no influence on the operation of the shutter.

It will be noted that inasmuch as the shutter disclosed is one which is automatically released to make an exposure as soon as it becomes fully cocked, it is necessary to set the exposure time before the shutter is actuated to be cocked and released. However, if the shutter is of the type which can be cocked and which will remain indefinitely in its cocked position until released by the operator, then it is possible to set the exposure time either before or after the shutter is cocked.

The embodiment of the invention which is illustrated in FIG. 2 will accomplish the same results as the embodiment of FIG. 2 but is even simpler than that of FIG. 1. With the embodiment of FIG. 2 all of the parts described above are the same, with the exception of the third spring of the spring means and the force-increasing means for rendering this third spring operative to urge the shutter-closing ring back toward its rest position when the exposure-time setting means is set to provide relatively short exposure times. In FIG. 2 the spring 6 is shown extending a direction opposite from that in which it extends in FIG. 1 only for the sake of clarity, and the same is of course true of the spring 5. It will be noted that these springs 5 and 6 still urge the shutter-opening ring 3 and the shutter-closing ring 4 in the same direction as in FIG. 1, and the pin 12 which determines the rest position of the rings is omitted from FIG. 2 for the sake of clarity.

In the embodiment of FIG. 2 the third spring of the spring means is formed by a coil spring 30 one end of which is permanently connected at 33 to the ring 4, so that in this embodiment the third spring of the spring means is permanently connected with the shutter-closing ring 4. The force-increasing means of the embodiment of FIG. 2 takes the form of a pin-and-slot connection between the ring 17 and the spring 30. This pin-and-slot connection includes a pin 32 which is fixed to the ring 17 for rotary movement therewith and a slot 31 which receives the pin 32. This slot 31 is in the form of an elongated loop formed by the outer free end portion of the coil spring 30, as indicated in FIG. 2. With this embodiment when the ring 17 is set to provide relatively long exposure times which are longer than the shortest exposure time, for example, the pin 32 is located so close to the connection 33 of the spring 30 to the ring 4 that the spring 30 remains completely untensioned in all positions of the ring 4 so that during the entire movement of the ring 4 during cocking of the shutter as well as during its return movement when the shutter runs down the spring 30 has no influence on the operation of the shutter. However, when the ring 17 is set to provide a relatively short exposure time such as the shortest possible exposure time, and the parts are shown in this position in FIG. 2, the pin 32 becomes spaced from the connection 33 by a great enough distance to cause the pin 32 to engage the outer end of the slot or loop 31 and to maintain the spring 30 under tension so that at this time the force-increase means formed by the pin-and-slot connection 31, 32 acts to then render the spring 30 operative for applying its force in addition to the force 6 for urging the ring 4 to return to its rest position, and thus with this embodiment also at relatively short exposure times the speed of movement of the ring 4 will be accelerated to provide accurate relatively short exposure times even with relatively large apertures. Thus, the relatively short exposure times are obtained with this structure not only with the force of the spring 6 but also with the force of the spring 30, so that the exposure times are shorter than would be possible if only the spring 6 acted upon the ring 4. Here again, with a shutter which is automatically released to make an exposure as soon as it becomes fully cocked it is necessary to set the exposure time before cocking of the shutter, whereas if the shutter is of the type which can be cocked and remain cocked indefinitely until released by the operator it is possible to set the exposure time either before or after cocking of the shutter. Thus, with such a shutter if the exposure time is set before the shutter is cocked then the spring 30 will be initially tensioned and will be further tensioned during the cocking of the shutter, whereas if the exposure time is set to a relatively short value after the cocking of the shutter, then the spring 30 becomes tensioned only upon setting of the relatively short exposure time. Also, with this type of shutter which can be cocked and which will remain indefinitely cocked before release by the operator, it is possible to change the exposure time, after cocking of the shutter, from a relatively short value to a relatively long exposure time, and in this case the tension of the spring 30 would be reduced to such an extent that it will have no influence on the operation of the shutter when it is released.

Of course, the invention is applicable not only to shutters of the particular type shown in the drawing and described above but also to shutters such as a type wherein the shutter-opening ring actuates a release lever to release the shutter-closing ring. Also, the invention is applicable to shutters were instead of annular rings the shutter elements are driven by linkages such as parallelogram linkages.

It is of course possible to increase the speed of operation of the shutter at relatively short exposure times with relatively large apertures by providing an additional spring which is connected to the shutter-opening ring 3, such an additional spring being used together wih a spring which cooperates with the shutter-closing ring 4 or even separately from such a spring, but one of the most surprising and very great advantages of the present invention resides precisely in providing an additional spring force which acts only and exclusively on the shutter-closing ring 4. It is as a result of this latter feature that the outstanding results of the invention are achieved, and these results are far beyond what would logically and theoretically be expected. Thus, as a result of the feature of providing the additional spring force to act exclusively on the shutter-closing ring at relatively short exposure times, it has been found most unexpectedly that it is possible to achieve the desired results while increasing the spring force to an extent which is far less than would have been expected through theoretical calculations. Thus, even if additional friction and other losses are neglected, it can be shown mathematically that for an aperture of, for example, 2.8, it is possible to reduce the exposure time from, for example, 3 milliseconds to, for example, 1.8 milliseconds with an additional spring force which is 2.8 times the original spring force which would normally be used if no measures were taken to provide accurate short exposure times for large apertures. Thus, as a result of theoretical and mathematical considerations one would expect under these conditions to have to increase the original spring force 2.8 times in order to achieve the desired results. However, it has been found by actual test that with the present invention by bringing the additional spring force to act exclusively on the shutter-closing ring it becomes possible to decrease the exposure time from 3 milliseconds, for example, to 1.8 milliseconds, for example, with an aperture of, for example, 2.8, by increasing the original spring force only 1.65 times. Thus, instead of an increase of 1.8, which would normally be expected, it is possible to increase the original spring force of 1 to 1.65 by providing only an additional force of 0.65, so that through the feature of connecting the additional spring force exclusively to the shutter-closing ring it is possible to reduce the increase in spring force which would normally be expected by approximately two-thirds, so that with the invention it is necessary to use only one-third of the normally expected increase in spring force in order to achieve the desired results, and this outstanding achievement is not at all to be expected from logical considerations. As a result, it is possible for the structure of the invention to increase the spring force to such a slight extent that the shutter is still very easy to operate, is still very compact and at the same time the frictional resistance of the parts is still maintained at a desirably low level and it thus becomes possible to achieve the desired results in a surprisingly efficient and inexpensive manner.

It will be understood that each of the elements described above or two or more together, may also find a useful application in other types of cameras differing from the types described above.

While the invention has been illustrated and described as embodied in shutters, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera, in combination, a shutter assembly including a shutter-opening ring and a shutter-closing ring; means coacting with said rings for respectively turning them together from rest positions thereof where the shutter is closed to cocked positions thereof while the shutter remains closed and for releasing said shutter-opening ring for return from said cocked to said rest position thereof for opening the shutter; spring means operatively connected to said rings for urging them to said rest positions thereof, respectively; exposure-time setting means operatively connected to said assembly for setting said assembly to provide exposure times ranging from relatively long to relatively short exposure times, said exposure time setting means comprising retarding means for releasing said shutter-closing ring a predetermined interval of time after release by said first mentioned means of said shutter-opening ring, whereupon said spring means returns said shutter-closing ring to said rest position thereof for closing the shutter; and force-increasing means actuated by said exposure-time setting means and coacting with said spring means for increasing only the force with which the spring means urges said shutter-closing ring to said rest position thereof when said exposure-time setting means sets the assembly to provide relatively short exposure times.

2. In a camera, in combination, a shutter assembly including a shutter-opening ring and a shutter-closing ring; means coacting with said rings for respectively turning them together from rest positions thereof where the shutter is closed to cocked positions while the shutter remains closed and for releasing said shutter-opening ring for return from said cocked to said rest position thereof for opening the shutter; a first spring connected permanently with said shutter-opening ring for permanently urging the latter to said rest position thereof; a second spring permanently connected with said shutter-closing ring for permanently urging the latter to said rest position thereof; a third spring; exposure-time setting means operatively connected to said assembly for setting the latter to provide exposure times ranging from relatively long to relatively short exposure times, said exposure time setting means comprising retarding means for releasing said shutter-closing ring a predetermined interval of time after release by said first mentioned means of said shutter-opening ring whereupon said second spring returns said shutter-closing ring to said rest position thereof for closing the shutter; and force-increasing means actuated by said exposure time setting means and coacting with said third spring for rendering the latter operative to urge only said shutter-closing ring to said rest position thereof only when said exposure-time setting means sets the assembly to provide relatively short exposure times.

3. In a camera, in combination, a shutter assembly including a shutter-opening ring and a shutter-closing ring; means coacting with said rings for respectively turning them together from rest positions thereof where the shutter is closed to cocked positions while the shutter remains closed and for releasing first said shutter-opening ring for return from said cocked to said rest position thereof for opening the shutter and then said shutter-closing ring for return from said cocked to said rest position thereof for closing the shutter; a first spring connected permanently with said shutter-opening ring for permanently urging the latter to said rest position thereof; a second spring permanently connected with said shutter-closing ring for permanently urging the latter to said rest position thereof; a third spring; exposure-time setting means operatively connected to said assembly for setting the latter to provide exposure times ranging from relatively long to relatively short exposure times; camming means connected to said exposure-time setting means for movement therewith; and lever means engaged by said third spring and placed by said camming means in a position transmitting the force of said third spring to said shutter-closing ring for urging the latter through said lever means to said rest position thereof only when said exposure-time setting means sets the assembly to provide relatively short exposure times.

4. In a camera, in combination, a shutter assembly including a shutter-opening ring and shutter-closing ring; means coacting with said rings for respectively turning them together from rest positions thereof where the shutter is closed to cocked positions while the shutter remains closed and for releasing first said shutter-opening ring for return from said cocked to said rest position thereof for opening the shutter and then said shutter-closing ring for return from said cocked to said rest position thereof for closing the shutter; a first spring permanently connected with said shutter-opening ring for permanently urging the latter to said rest position thereof; a second spring permanently connected with said shutter-closing ring for permanently urging the latter to said rest position thereof; a third spring permanently connected with said shutter-closing ring; exposure-time setting means operatively connected to said assembly for setting said assembly to provide exposure times ranging from relatively long to relatively short exposure times; and pin-and-slot means connecting said third spring to said exposure-time setting means for tensioning said third spring to urge said shutter-closing ring to said rest position thereof only when said exposure-time setting means sets the assembly to provide relatively short exposure times.

5. In a camera, in combination, a shutter assembly including a shutter-opening ring and shutter-closing ring; means coacting with said rings for respectively turning them together from rest positions thereof where the shutter is closed to cocked positions while the shutter remains closed and for releasing first said shutter-opening ring for return from said cocked to said rest position thereof for opening the shutter and then said shutter-closing ring for return from said cocked to said rest position thereof for closing the shutter; a first spring permanently connected with said shutter-opening ring for permanently urging the latter to said rest position thereof; a second spring permanently connected with said shutter-closing ring for permanently urging the latter to said rest position thereof; a third spring permanently connected with said shutter-closing ring; exposure-time setting means operatively connected to said assembly for setting said assembly to provide exposure times ranging from relatively long to relatively short exposure times; and pin-and-slot means connecting said third spring to said exposure-time setting means for tensioning said third spring to urge said shutter-closing ring to said rest position thereof only when said exposure-time setting means sets the assembly to provide relatively short exposure times, said pin-and-slot means including a pin carried by said exposure-time setting means and an elongated loop formed at one end of said third spring and receiving said pin.

6. In a camera, in combination, a shutter assembly including a shutter-opening ring and shutter-closing ring; means coacting with said rings for respectively turning them together from rest positions thereof where the shutter is closed to cocked positions while the shutter remains closed and for releasing first said shutter-opening ring for return from said cocked to said rest position thereof for opening the shutter and then said shutter-closing ring for return from said cocked to said rest position thereof for closing the shutter; a first spring permanently connected with said shutter-opening ring for permanently urging the latter to said rest position thereof; a second spring permanently connected with said shutter-closing ring for permanently urging the latter to said rest position thereof; a third spring permanently connected with said shutter-closing ring; exposure-time setting means operatively connected to said assembly for setting said assembly to provide exposure times ranging from relatively long to relatively short exposure times; and pin-and-slot means connecting said third spring to said exposure-time setting means for tensioning said third spring to urge said shutter-closing ring to said rest position thereof only when said exposure-time setting means sets the assembly to provide relatively short exposure times, said pin-and-slot means maintaining said third spring in a position where it has no influence on said shutter-closing ring when said exposure-time setting means is set to provide relatively long exposure times even when said rings are in their cocked positions, respectively.

7. In a camera, in combination, a shutter assembly including a shutter-opening ring and a shutter-closing ring; means coacting with said rings for respectively turning them together from rest position thereof where the shutter is closed to cocked positions while the shutter remains closed and for releasing first said shutter-opening ring for return from said cocked to said rest position thereof for opening the shutter and then said shutter-closing ring for return from said cocked to said rest position thereof for closing the shutter; a first spring connected permanently to said shutter-opening ring for permanently urging the latter to said rest position thereof; a second spring connected permanently to said shutter-closing ring for permanently urging the latter to said rest position thereof; a pin carried by said shutter-closing ring; lever means; a third spring acting on said lever means for urging the latter against said pin to transmit the force of said third spring through said lever means and pin to said shutter-closing ring for urging the latter to said rest position thereof with the force of said third spring; exposure-time setting means operatively connected to said assembly for setting the same to provide exposure-times ranging from relatively long to relatively short exposure times; and cam means connected to said exposure-time setting means for movement therewith and engaging said lever means for maintaining the latter in opposition to said third spring away from said pin except when said exposure-time setting means sets the assembly to provide relatively short exposure times, whereby said shutter-closing ring is urged to said rest position thereof with an increased force when said exposure-time setting means sets the assembly to provide relatively short exposure times.

8. In a camera as recited in claim 7, said exposure-time setting means being in the form of a rotary ring and said camming means being integral with said exposure-time setting means and being in the form of a curved outer peripheral portion of said latter ring.

References Cited by the Examiner
UNITED STATES PATENTS

| | | | |
|---|---|---|---|
| 1,963,324 | 6/1934 | Deckel | 95—63 |
| 2,198,729 | 4/1940 | Junghans | 95—63 |
| 2,890,640 | 6/1959 | Noack | 95—63 |
| 2,925,024 | 2/1960 | Junghans | 95—63 |
| 3,014,418 | 12/1961 | Hahn | 95—63 |

JOHN M. HORAN, *Primary Examiner.*

NORTON ANSHER, *Examiner.*